US012688101B2

(12) United States Patent
Jayasingh et al.

(10) Patent No.: US 12,688,101 B2
(45) Date of Patent: Jul. 21, 2026

(54) SYSTEMS AND METHODS FOR AUTO-ESTABLISHING DATA TRANSFERS BETWEEN DATA CENTERS FOR BATCH PROCESSING

(71) Applicant: BANK OF AMERICA CORPORATION, Charlotte, NC (US)

(72) Inventors: Magaranth Jayasingh, Chennai (IN); Vimal Chandroliya, Gandhinagar (IN); Rajesh Natarajan, Chennai (IN); Preethi Jagadeesan, Chennai (IN); Dhivya DK, Chennai (IN); Sphurti Milind Deorukhkar, Mumbai (IN); Senthil Kumar Selvaraj, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 10 days.

(21) Appl. No.: 18/788,498

(22) Filed: Jul. 30, 2024

(65) Prior Publication Data

US 2026/0037400 A1     Feb. 5, 2026

(51) Int. Cl.
*G06F 11/20* (2006.01)
*G06F 11/1446* (2026.01)

(52) U.S. Cl.
CPC ...... *G06F 11/2097* (2013.01); *G06F 11/1464* (2013.01); *G06F 11/2023* (2013.01)

(58) Field of Classification Search
CPC .. G06F 11/202; G06F 11/2023; G06F 11/203; G06F 11/2097
See application file for complete search history.

(56) References Cited

U.S. PATENT DOCUMENTS

| | | | | |
|---|---|---|---|---|
| 6,418,540 | B1 * | 7/2002 | Dempsey | G06F 11/2097 |
| | | | | 712/228 |
| 2009/0300414 | A1 * | 12/2009 | Huang | G06F 11/2097 |
| | | | | 718/1 |
| 2012/0084445 | A1 * | 4/2012 | Brock | G06F 9/5077 |
| | | | | 709/226 |
| 2020/0089582 | A1 * | 3/2020 | Piduri | H04L 67/34 |

* cited by examiner

*Primary Examiner* — Michael Maskulinski
(74) *Attorney, Agent, or Firm* — Moore & Van Allen PLLC; Lauren M. Stokes

(57) ABSTRACT

Systems, computer program products, and methods are described herein for auto-establishing data transfers between data centers for batch processing. The present disclosure is configured to identify a process associated with a primary site; determine a backup site associated with the primary site; apply the process to the backup site; generate, by an imitation artifact component, a record counter of the process as the process runs in the primary site, wherein the record counter comprises a cursor position indicating a current operation of the process; and mimic, based on the record counter, the process in the backup site as the process runs in the primary site.

19 Claims, 6 Drawing Sheets

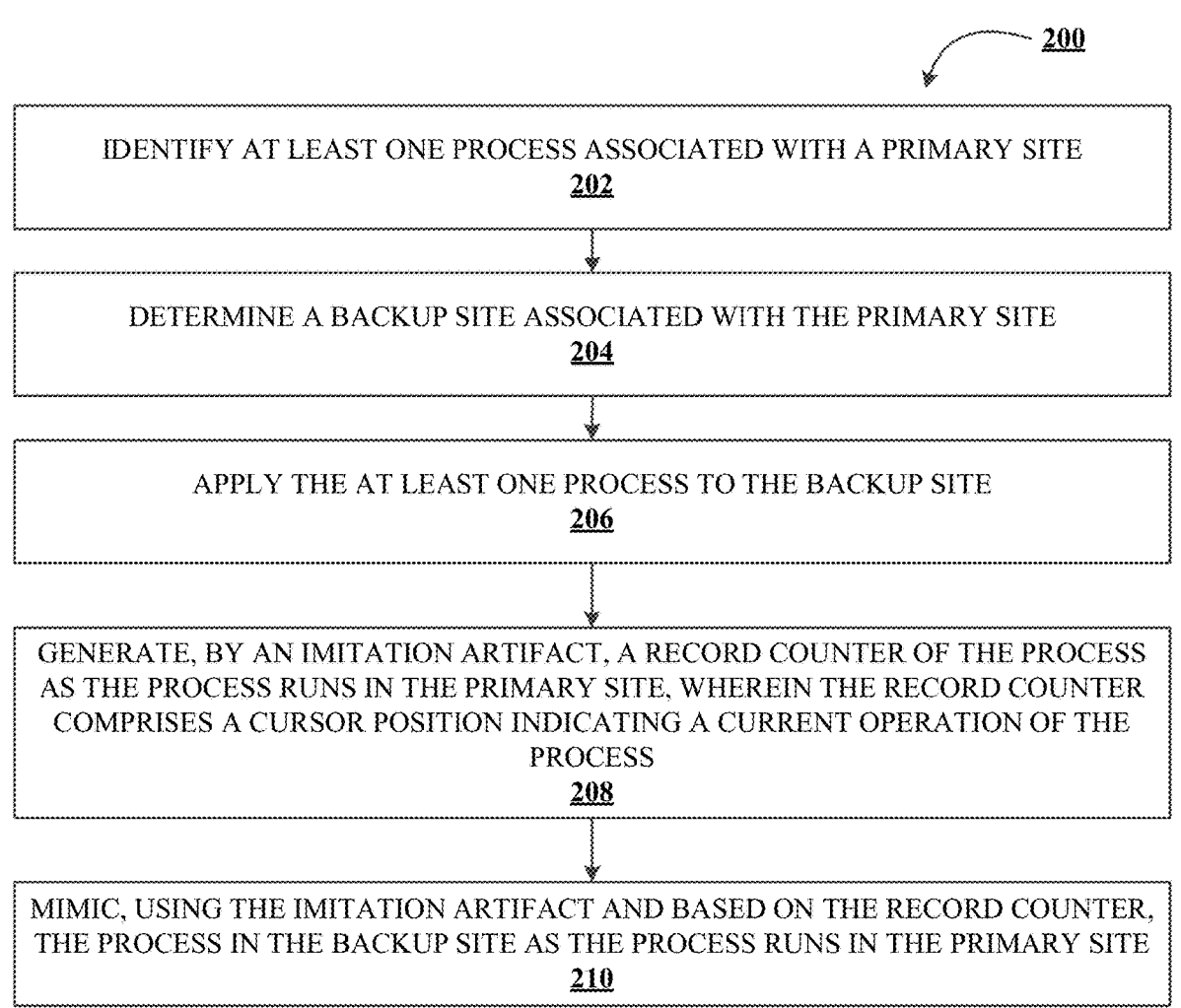

200

IDENTIFY AT LEAST ONE PROCESS ASSOCIATED WITH A PRIMARY SITE
202

DETERMINE A BACKUP SITE ASSOCIATED WITH THE PRIMARY SITE
204

APPLY THE AT LEAST ONE PROCESS TO THE BACKUP SITE
206

GENERATE, BY AN IMITATION ARTIFACT, A RECORD COUNTER OF THE PROCESS AS THE PROCESS RUNS IN THE PRIMARY SITE, WHEREIN THE RECORD COUNTER COMPRISES A CURSOR POSITION INDICATING A CURRENT OPERATION OF THE PROCESS
208

MIMIC, USING THE IMITATION ARTIFACT AND BASED ON THE RECORD COUNTER, THE PROCESS IN THE BACKUP SITE AS THE PROCESS RUNS IN THE PRIMARY SITE
210

FIGURE 2

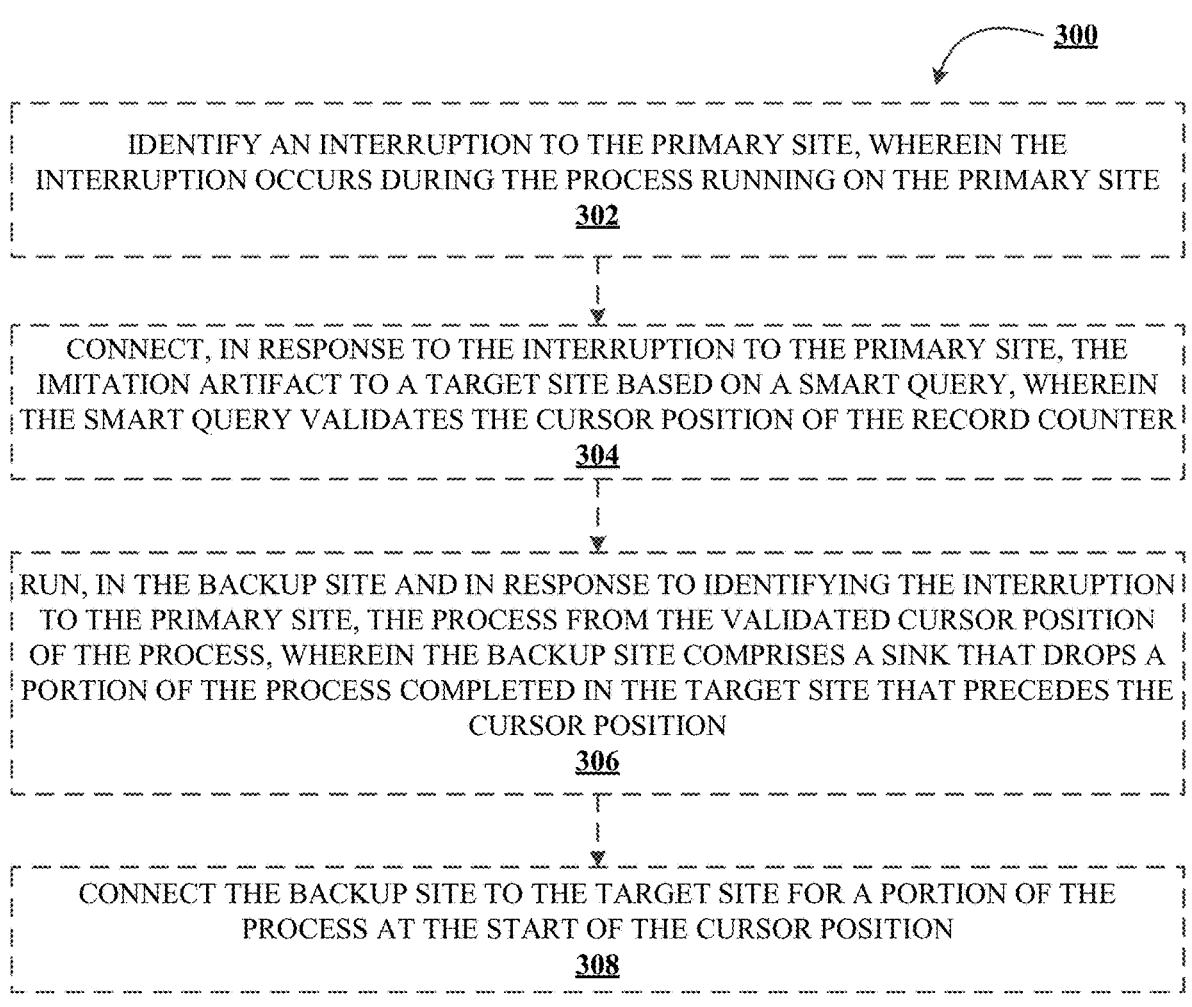

IDENTIFY AN INTERRUPTION TO THE PRIMARY SITE, WHEREIN THE INTERRUPTION OCCURS DURING THE PROCESS RUNNING ON THE PRIMARY SITE
302

CONNECT, IN RESPONSE TO THE INTERRUPTION TO THE PRIMARY SITE, THE IMITATION ARTIFACT TO A TARGET SITE BASED ON A SMART QUERY, WHEREIN THE SMART QUERY VALIDATES THE CURSOR POSITION OF THE RECORD COUNTER
304

RUN, IN THE BACKUP SITE AND IN RESPONSE TO IDENTIFYING THE INTERRUPTION TO THE PRIMARY SITE, THE PROCESS FROM THE VALIDATED CURSOR POSITION OF THE PROCESS, WHEREIN THE BACKUP SITE COMPRISES A SINK THAT DROPS A PORTION OF THE PROCESS COMPLETED IN THE TARGET SITE THAT PRECEDES THE CURSOR POSITION
306

CONNECT THE BACKUP SITE TO THE TARGET SITE FOR A PORTION OF THE PROCESS AT THE START OF THE CURSOR POSITION
308

FIGURE 3

SYSTEMS AND METHODS FOR AUTO-ESTABLISHING DATA TRANSFERS BETWEEN DATA CENTERS FOR BATCH PROCESSING

TECHNOLOGICAL FIELD

Example embodiments of the present disclosure relate to systems and methods for auto-establishing data transfers between data centers for batch processing.

BACKGROUND

Data center resiliency is often achieved using redundant components, systems and facilities, such as backup facilities with the same or similar components or capabilities to the primary facilities. Thus, when one data center fails or experiences a disruption, the redundant or backup data centers take over and continues to provide computing services for the tasks that were being handled by the interrupted data center. In other words, the backup facilities may typically mirror the important data of the primary data center and in the case of an outage to the primary data center, a load balancer may switch to the backup data center to continue the operations. However, a main problem with using these backup facilities is that despite the data being mirrored concurrently to the backup data center, there is a gap of seamlessly transferring the processes to the backup data center as the batch processes that were running on the primary data center are usually aborted and the backup data center has to restart from the $0^{th}$ or beginning of the batch process to make sure none of the processes were missed. Such redundant processing may cause greater burdens on both the primary data center and the backup data center's computing resources. Thus, a need exists for a system that can accurately, efficiently, and dynamically auto-establish data transfers between data centers for batch processing without allowing redundant processing between the data centers.

Applicant has identified a number of deficiencies and problems associated with establishing data transfers between data centers when a primary data center's operation is interrupted. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for auto-establishing data transfers between data centers for batch processing.

In one aspect, a system for auto-establishing data transfers between data centers for batch processing is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify at least one process associated with a primary site; determine a backup site associated with the primary site; apply the at least one process to the backup site; generate, by an imitation artifact component, a record counter of the process as the process runs in the primary site, wherein the record counter comprises a cursor position indicating a current operation of the process; and mimic, based on the record counter, the process in the backup site as the process runs in the primary site.

In some embodiments, executing the computer-readable code is further configured to cause the at least one processing device to: identify an interruption to the primary site, wherein the interruption occurs during the process running on the primary site; connect, in response to the interruption to the primary site, the imitation artifact to a target site based on a smart query, wherein the smart query validates the cursor position of the record counter; run, in the backup site and in response to identifying the interruption to the primary site, the process from the validated cursor position of the process, wherein the backup site comprises a sink that drops a portion of the process completed in the target site that precedes the cursor position; and connect the backup site to the target site for a portion of the process at the start of the cursor position.

In some embodiments, the cursor position is based on a process time comprising a time since a start of processing running in the primary site. In some embodiments, the cursor position is based on a response time of a read operation and a write operation of the process running on the primary site, and wherein the response time is determined based on a volume of output dataset and a central processing unit (CPU) utilization of the primary site.

In some embodiments, the primary site comprises a primary data center.

In some embodiments, the backup site comprises a backup data center.

In some embodiments, the application of the at least one process to the backup site is in real time or near real time to the identification of the at least one process associated with the primary site.

In some embodiments, the imitation artifact comprises an interface between the process and a target site or a source site.

In some embodiments, the imitation artifact is housed on the backup site and wherein the imitation artifact operates as a sink until an instance where the process in the primary site is interrupted.

In some embodiments, the current operation comprises at least one of a read operation or a write operation. In some embodiments, the read operation or the write operation is based on the read operation at a target site or the write operation at the target site for the at least one process.

In some embodiments, the backup site comprises a plurality of backup sites.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

Figure 1A:
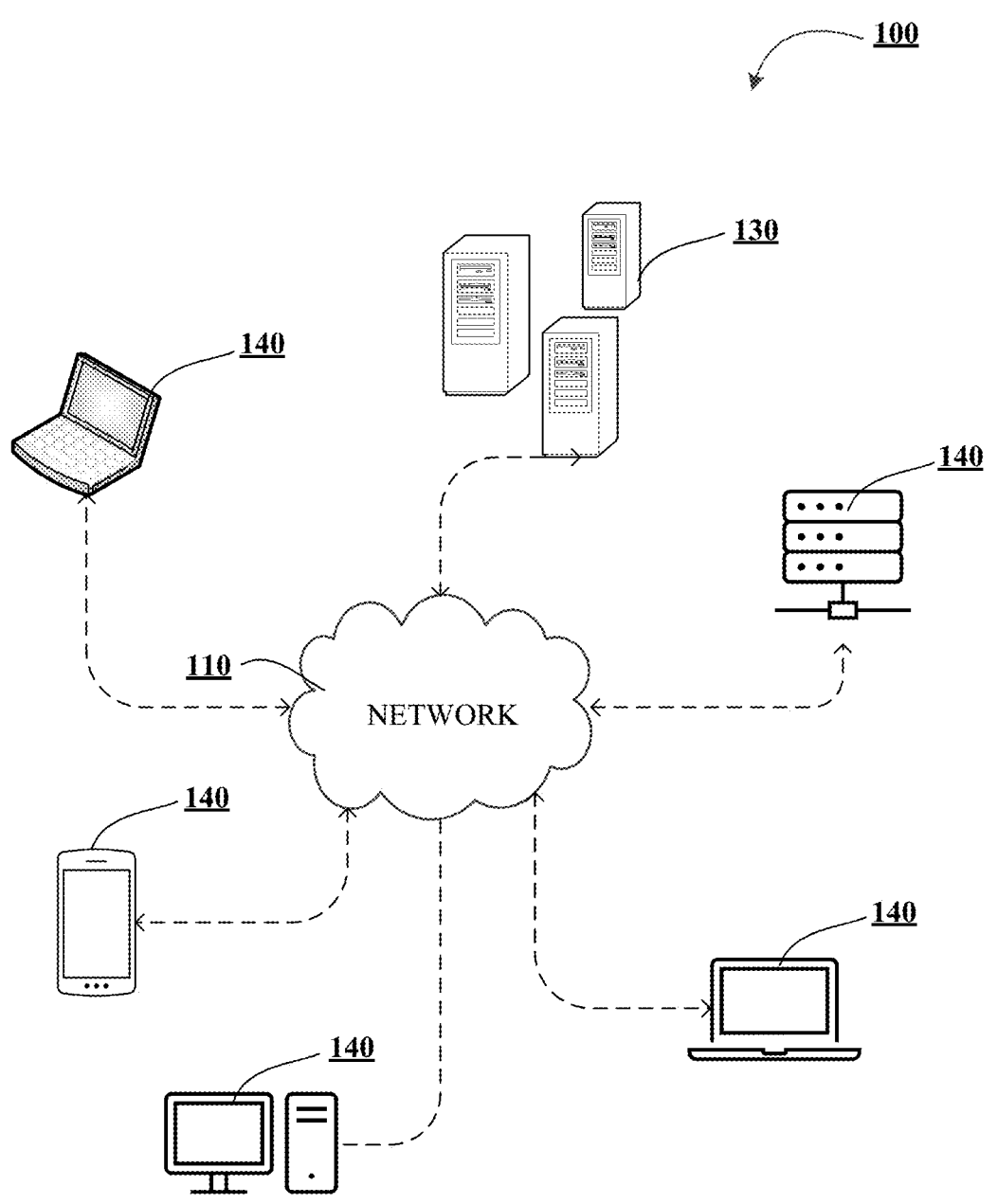
Figure 1B:
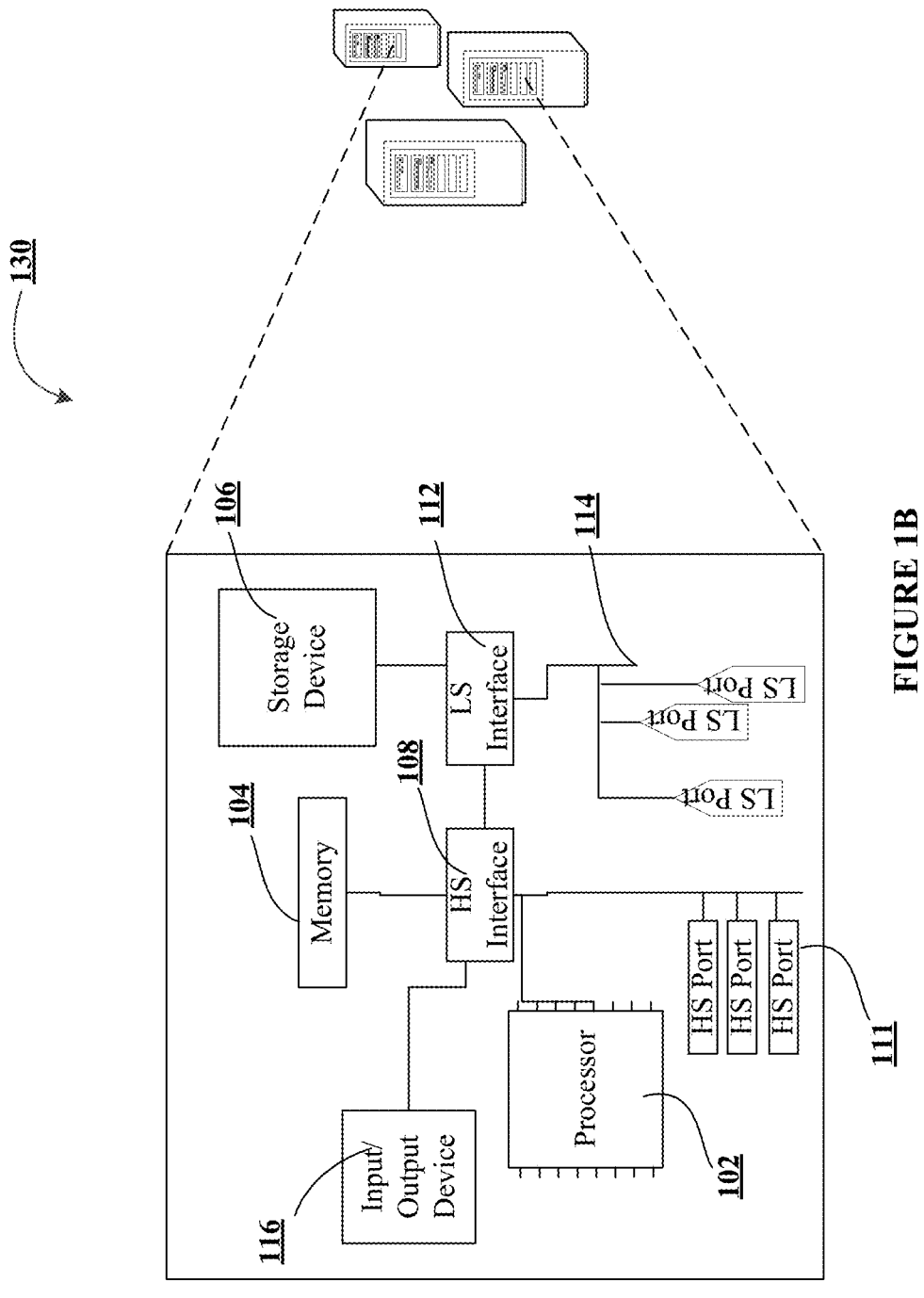
Figure 1C:
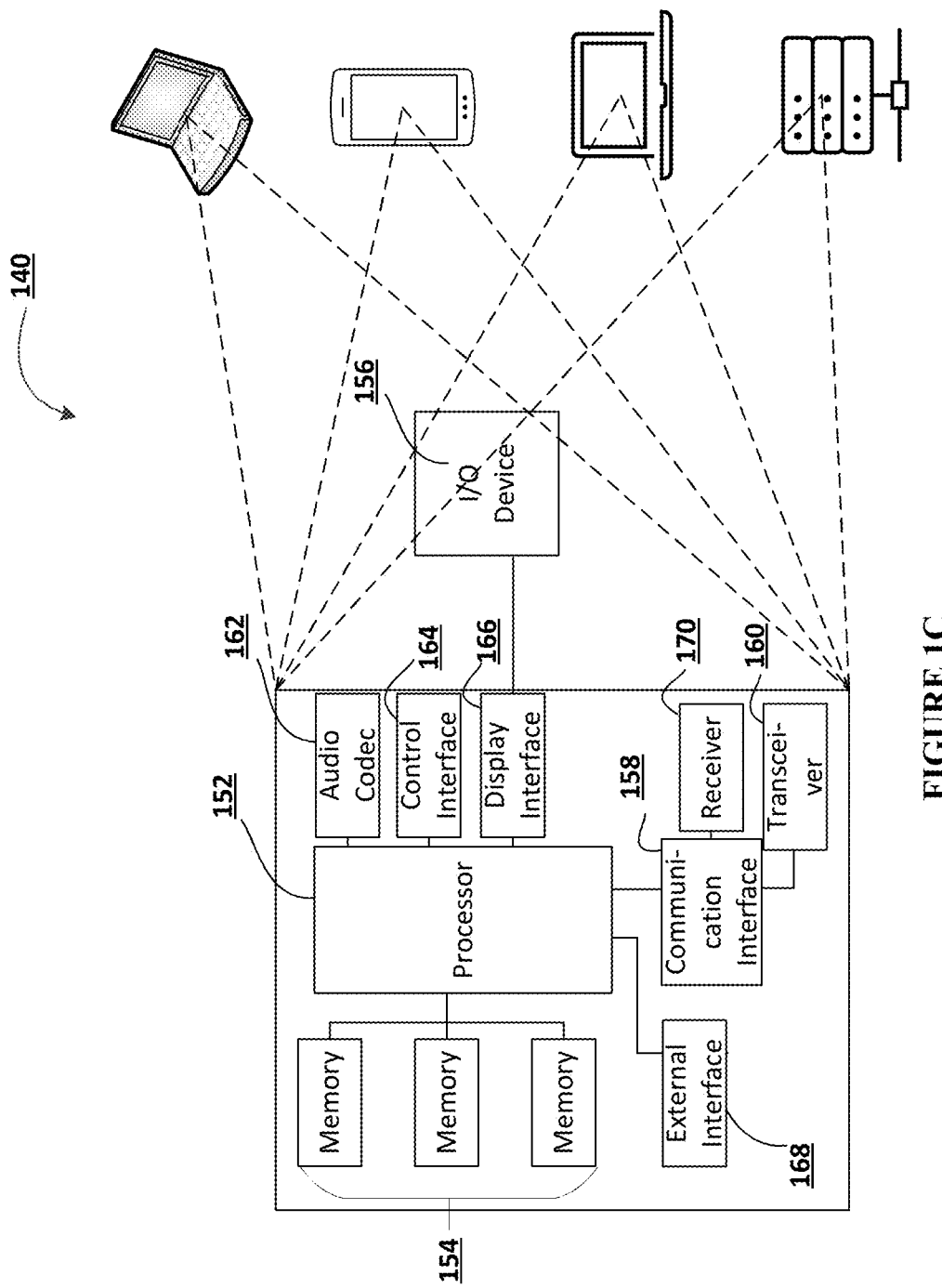
Figure 4:
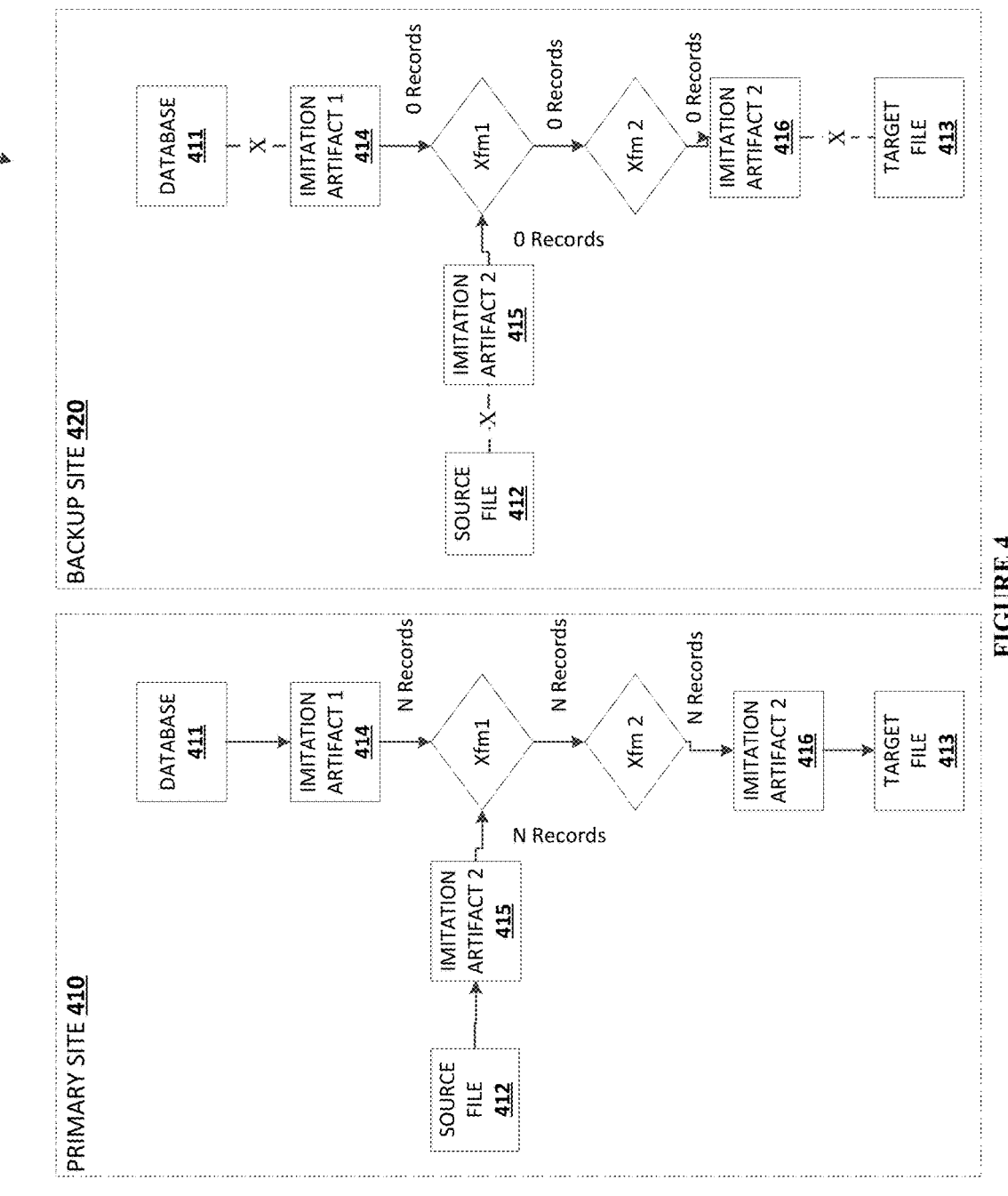

FIGS. 1A-1C illustrates technical components of an exemplary distributed computing environment for auto-establishing data transfers between data centers for batch processing, in accordance with an embodiment of the disclosure;

FIG. 2 illustrates a process flow for auto-establishing data transfers between data centers for batch processing, in accordance with an embodiment of the disclosure;

FIG. 3 illustrates a process flow for connecting the backup site to a target site to continue the process from the primary site, in accordance with an embodiment of the disclosure; and FIG. 4 illustrates a technical diagram for auto-establishing data transfers between data centers for batch processing, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Data center resiliency is often achieved using redundant components, systems and facilities, such as backup facilities with the same or similar components or capabilities to the primary facilities. Thus, when one data center fails or experiences a disruption, the redundant or backup data centers take over and continues to provide computing services for the tasks that were being handled by the interrupted data center. In other words, the backup facilities may typically mirror the important data of the primary data center and in the case of an outage to the primary data center, a load balancer may switch to the backup data center to continue the operations. However, a main problem with using these backup facilities is that despite the data being mirrored concurrently to the backup data center, there is a gap of seamlessly transferring the processes to the backup data center as the batch processes that were running on the primary data center are usually aborted and the backup data center has to restart from the $0^{th}$ or beginning of the batch process to make sure none of the processes were missed. Such redundant processing may cause greater burdens on both the primary data center and the backup data center's computing resources. Thus, a need exists for a system that can accurately, efficiently, and dynamically auto-establish data transfers between data centers for batch processing without allowing redundant processing between the data centers.

Accordingly, the present disclosure provides the identification of at least one process associated with a primary site; the determination of a backup site associated with the primary site; the application of the at least one process to the backup site; and the generation, by an imitation artifact, of a record counter of the at least one process as the at least one process runs in the primary site, wherein the record counter comprises a cursor position indicating a current operation of the at least one process. Additionally, the disclosure provides for the mimicking, using the imitation artifact and based on the record counter, of the at least one process in the backup site as the at least one process runs in the primary site. Further, and in some embodiments, the disclosure provides the identification of an interruption to the primary site, wherein the interruption occurs during the at least one process running on the primary site; the connection, in response to the interruption to the primary site, of the imitation artifact to a target site based on a smart query, wherein the smart query validates the cursor position of the record counter; the running, in the backup site and in response to identifying the interruption to the primary site, of the at least one process from the validated cursor position of the at least one process, wherein the backup site comprises a sink that drops a portion of the at least one process completed in the target site that precedes the cursor position; and the connection of the backup site to the target site for a portion of the at least one process at the start of the cursor position.

Thus, and in other words, the present disclosure provides a system that seamlessly transfers processes to a backup data center when a primary data center undergoes an interruption, such as a power outage, equipment failure, and/or the like. The batch processes that were running on the primary data center would typically be aborted during the primary data center outage and on rerun would start from the $0^{th}$ record in the backup data center, thus causing processing redundancy and process interruption when the current process is later in the record. The disclosure provides for every process that runs in the primary data center will also be run in the backup data center and an imitation artifact which will act as a sink in the backup data center and act as an interface between the batch process and the target. In an instance where the primary data center is working, then the imitation artifact will bypass the sink and connect to the intended target. In an instance where the primary data center is down, then the imitation artifact will connect to the target using a smart query designed to identify the current record counter which is continuously updated by the imitation artifact based on how much time has passed since the beginning of the process in the primary data center, the volume of the result set generated by the primary data center, the CPU utilization, and/or the like. Thus, and where record counter is currently for the process, the imitation artifact will act as a sink for the processes already handled in the primary data center and then the backup data center will only handle the process from the current position of the record.

What is more, the present disclosure provides a technical solution to a technical problem. As described herein, the technical problem includes establishing data transfers between data centers when a primary data center's operation is interrupted. The technical solution presented herein allows for auto-establishing data transfers between data centers by stretching the batch processing between the data centers through at least one imitation artifact(s). In particular, the disclosure provided herein is an improvement over existing solutions to the establishing data transfers between data centers when a primary data center's operation is interrupted, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for auto-establishing data transfers between data centers for batch processing 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for auto-establishing data transfers between data centers for batch processing, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200.

As shown in block 202, the process flow 200 may include the step of identifying at least one process associated with a primary site. For instance, and as used herein, the system may identify a primary site as a physical facility that houses hardware and software for storing, managing, and sharing data (such as between a source site and a target site). Thus, and in some embodiments, the primary site may refer to or comprise a primary data center which is configured to store, manage, and share data by using its servers, network equipment, data storage drives, and/or the like. Additionally, and in some embodiments, the system may identify a primary site that has received a process comprising at least one task to be performed on the data associated with the at least one process. In some such embodiments, the at least one process may comprise a batch process which may comprise the collecting, processing, and storing of the associated data in batches, such that a plurality of tasks must occur by the primary site (or a backup site as described herein) for the batch process to be completed. Additionally, and in some embodiments, the at least one process (or the at least one batch process) may comprise an identification of a source for the process, a database for the process, a target site, and/or the like, whereby each of the source, database, and target, determine where the data is coming from, where the data is currently stored, and where the data is intended to be sent, respectively, during the process (batch process).

As shown in block 204, the process flow 200 may include the step of determining a backup site associated with the primary site. For example, a backup site may refer to a backup data center, which may be configured to take over the at least one process in an instance where the primary site is interrupted in its task(s). Such an interruption may comprise a technical failure, interruption to network connectivity or capabilities, malfunctions, and/or the like. In some embodiments, the backup site may be identified based on a close (or closest) proximity to the primary site, a current utilization of the backup site (such that the backup site with the lowest current utilization, such as lowest power consumption), and/or the like. In some embodiments, the backup site may be based on both an identification of a closest backup site and the closest backup site with the lowest current utilization.

In some embodiments, the identified backup site may comprise a plurality of backup sites, whereby the plurality of backup sites may be chosen from to identify/select a backup site to process the at least one process from the primary site. In some embodiments, a plurality of backup sites may be selected to process portions of the process from the primary site, such as in an instance where one backup site will not enough to complete the at least one process.

As shown in block 206, the process flow 200 may include the step of applying the at least one process to the backup site. For instance, the system may apply the at least one process that has already been applied to the primary site, to the backup site. Thus, and in such embodiments, the backup site may start the at least one process at the same time or in near real time to the at least one process running on the primary site. For instance, and as disclosed in further detail herein, the process being applied to the backup site may comprise the process being mimicked on the backup site, but not actually run on the backup site. Thus, and in some embodiments, the application of the at least one process to the backup site is in real time or near real time to the identification of the at least one process associated with the primary site. For example, and in some such embodiments, the running of the process on the backup site may comprise the running of the process on an imitation artifact associated or stored at the backup site. In this manner, computing resources may be saved as only one site will need actually process the tasks of the at least one process at a time and any redundant processing between the primary site and the backup site may be avoided.

As shown in block 208, the process flow 200 may include the step of generating, by an imitation artifact, a record counter of the process as the process runs in the primary site, wherein the record counter comprises a cursor position indicating a current operation of the process. For instance, the system may generate, using an imitation artifact, a record counter to show the current operation occurring at the primary site for the at least one process. As used herein, an "imitation artifact" refers to a technical component that mirrors or mimics the process in the primary site and/or in the backup site(s), without actually storing or reading or writing data. In this manner, imitation artifact may not contain or store any data, but may instead be essential for certain task steps that require a valid data set reference (e.g., a reference of where in the process the primary site and/or the backup site has completed and what still needs to be completed, which may be indicated by a record counter comprising a cursor position that the imitation artifact generates).

For example, the imitation artifact may be configured to generate a record counter, whereby the record counter comprises a record of each task for the at least one process that is necessary for the at least one process to be completed. As each task is completed for the at least one process (such as by the primary site communicating with the source site, the target site, the database, and/or the like), then the record counter may be updated via its cursor position. As used herein, the cursor position may comprise an indicator for all the tasks that have been completed and the task that is in the process of being completed currently. By way of non-limiting example, if the record counter comprised a list or table of all the tasks needing to be completed for the at least one process, then the cursor position may move down the list for each task and stop at the task that is currently being worked on at the primary site, and only once that current task has been completed may the cursor position move onto the next task in the record counter. Thus, and in such an embodiment, where the cursor position is currently may indicate to the system what has been completed (e.g., what precedes the current cursor position in the list), what is in the queue currently for completion (e.g., where is the cursor position currently), and what still needs to be completed (e.g., what tasks follow the current cursor position in the record counter). Thus, and in other words, the cursor position may show the current operation that the primary site is currently undergoing or running.

In some embodiments, the current operation comprises at least one of a read operation or a write operation. For example, and in some such embodiments, the current operation may comprise a read operation and/or a write operation at the target site, which may have been a part of or the entirety of the current task for completing the at least one process. Thus, and in some embodiments, the read operation or the write operation are based on the read operation at a target site or the write operation at the target site for the at least one process. In some embodiments, and where the task requires a read operation and a write operation, and where the primary site comprises an interruption before the write operation may occur, then the cursor position may indicate that the current task has not yet been completed by the primary site (and thus, needs to be completed by the backup site).

In some embodiments, the cursor position is based on a process time comprising a time since a start of processing running in the primary site. For instance, the system—using the imitation artifact—may determine the current cursor position based on the current time in the process from the time the process started in the primary site. Based on previous instances of how the primary site performs with completing each read and write function, the system—using the imitation artifact—may determine at which point in the tasks of the record counter the primary site is currently and which tasks have already been completed. Additionally, and in some embodiments, the imitation artifact may determine the process time since the start of the process running on the backup site, rather than the primary site, as the process running in the backup site starts at the same time or in near real time to the process on the primary site. Further, and in some embodiments, the cursor position may be based on a response time of a read operation and a write operation of the process running on the primary site, and wherein the response time is determined based on a volume of output dataset and a central processing unit (CPU) utilization of the primary site. Thus, and in some such embodiments, the response time of the read operation and/or the write operation for each source site and/or target site may be determined by calculating using a volume of the result set (e.g., the output from the primary site associated with the source site and/or target site), the central processing unit (CPU) utilization of the primary, and/or the like. In some embodiments, each of these factors (e.g., the volume of the result set and the CPU utilization may be compared to previous instances of the primary site's volume of result set and the CPU utilization and their completion of previous tasks in a previous batch process). Thus, and in some embodiments, the comparison of each of these current factors with previous factors may be used by the system to determine an expected cursor position of tasks completed, current task, and tasks to be completed).

In some embodiments, the imitation artifact is housed on the backup site and the imitation artifact operates as a sink until an instance where the process in the primary site is interrupted. Thus, and by way of non-limiting example, an imitation artifact, like the one described hereinabove, may be housed or stored on a backup site or operatively coupled to a backup site, and in an instance where the primary site is still functioning and performing the tasks of the process, then the backup site housed or coupled with the backup site may act as a sink or black hole in the backup site. Thus, and while the primary site is performing, the imitation artifact may silently discard or drop the data of the tasks in the batch process that have already been completed and are in the process of being completed by the primary site.

Additionally, and in some embodiments, the imitation artifact may act as an interface between the process (the batch process) and a target site and/or a source site, such that in an instance where the imitation artifact is an interface between the primary site and the target site and/or the source site, then the imitation artifact may bypass the sink or blackhole and connect to the source site and/or target site to complete the task for the process. Thus, and in some embodiments, multiple (or at least two) imitation artifacts may be used in the system described herein, such as an imitation artifact for the primary site and an imitation artifact for the backup site. Therefore, and in some such embodiments, an imitation artifact at the primary site may perform as an interface in the primary site and as a sink in the backup site, when the primary site is performing correctly to complete the tasks of the batch process. However, and in some embodiments, the imitation artifact of the backup site may also perform by connecting with the source site and/or the target site in an instance where the primary site is interrupted in its function and the backup site must take over to complete the tasks of the batch process.

As shown in block 210, the process flow 200 may include the step of mimicking, using the imitation artifact and based on the record counter, the process in the backup site as the process runs in the primary site. For example, the system may mimic—using the imitation artifact and based on the record counter—the process in the backup site with the process running in the primary site, such that the process in the backup site is mimicked or mirrored as a simulation (e.g., without actually running) on the backup site as compared to actual running in the primary site. Thus, and by using the imitation artifact in this manner, the system described herein may allow for the real time tracking of the processes and operations running in the primary site, without allowing for duplicate or redundant processing between the primary site and the backup site. Therefore, the system described herein may conserve computing resources between the primary site and the backup site while also making sure that each task for each process is performed and completed only once, either at the primary site or at the backup site, especially in an instance where the primary site is interrupted. For instance, and as described in further detail with respect to FIG. 3, the system described herein allows for the real time or near real time transfer of the process and its performance to complete the tasks from the primary site to the backup site, while maintaining integrity of the processes, security of the data at each site, and by avoiding redundant processing.

FIG. 3 illustrates a process flow 300 for connecting the backup site to a target site to continue the process from the primary site, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

In some embodiments, and as shown in block 302, the process flow 300 may include the step of identifying an interruption to the primary site, wherein the interruption occurs during the process running on the primary site. For example, the system may identify an interruption to the functioning of the primary site, such as an interruption due to machine failure, network connectivity failure, power outage, cooling failures for machine components, human error, hardware malfunctioning, software bugs, cyberattacks, and/or the like, which causes the primary site to not perform any of its intended functions.

Further, and in some embodiments, the interruption identified at the primary site may be identified during the process running on the primary site (e.g., as the batch process is run on the primary site). Thus, and in some embodiments, in an instance where the process is running on the primary site and the primary site may have already completed some but not all of the tasks of running the process, an interruption may be identified, and the system may determine that the primary site cannot continue with running the process to completion. Therefore, and in such an instance, the system may connect imitation artifact (such as the imitation artifact at the backup site) to a target site and/or a source site such that the process may continue running at the backup site. Further, and leading up to this instance, and when the primary site was still able to perform its functions, the backup site's imitation artifact may have been acting as a sink or a black hole for each of the tasks and associated data as the tasks had been completed at the primary site. Therefore, all that is left for the backup site to run or perform are the tasks that were not completed by the primary site and the associated data that had not already been sent to the sink or black hole.

In some embodiments, and as shown in block 304, the process flow 300 may include the step of connecting, in response to the interruption to the primary site, the imitation artifact to a target site based on a smart query, wherein the smart query validates the cursor position of the record counter. For instance, the system may connect the imitation artifact (in the backup site) to a target site and/or a source site using a smart query, which may use minimal computing resources, to do at least one validation such as access check (e.g., checking that the target site and/or the source site are available for accessing by the imitation artifact), data availability, CPU utilization, and/or the like. Further, and in some such embodiments, the imitation artifact (in the backup site) may act as a sink or black hole for any input records (such as those that have already been completed by the primary site) and may only capture the record counter and update cursors position based on the access pattern from source site and/or target site (e.g., the pattern of access from and/or to the source site and/or the target site), the number of read and write operations completed (e.g., as compared to the current cursor position for validation), the calculated response time (described hereinabove), the retrieval method (e.g., the methods for retrieving data from the source site and/or database), and/or the like. Thus, and based on at least one of these factors (and/or all of these factors), the system may validate the current cursor position of the record counter and determine where in the record counter the backup site should pick up from for completing the batch process, without redundant processing.

In some embodiments, and as shown in block 306, the process flow 300 may include the step of running, in the backup site and in response to identifying the interruption to the primary site, the process from the validated cursor position of the process, wherein the backup site comprises a sink that drops a portion of the process completed in the target site that precedes the cursor position. For instance, the system may run the process at the backup site based on running the process from the validated cursor position (e.g., the task at the validated cursor position) and allowing the imitation artifact to act as a sink or black hole for any of the tasks and associated data that precedes the validated cursor position which indicates that these tasks and associated data were completed by the primary site. Thus, and in other words, the backup site may comprise the imitation artifact that acts as a sink (e.g., the imitation artifact acts as a sink) for the portion of the process that has already been completed in the target site (e.g., precedes the current cursor position in the record).

In some embodiments, and as shown in block 308, the process flow 300 may include the step of connecting the backup site to the target site for a portion of the process at the start of the cursor position. For example, the system may connect the backup site to the target site and/or the source site for the portion of the process at the start of the cursor position. Thus, and in some embodiments, the system may use the validated cursor position determined herein as the starting point for the backup site to perform the tasks and functions to complete the batch process. Such a connection by the backup site may comprise a connection via an interface created by the imitation artifact from the backup site to the target site and/or to the source site.

In some embodiments, the validation of the cursor position may be left out of the process described herein, and the backup site may perform the functions and tasks to complete the cursor position determined at block 208.

FIG. 4 illustrates a technical diagram 400 for auto-establishing data transfers between data centers for batch processing, in accordance with an embodiment of the disclosure. In some embodiments, a system (e.g., similar to one or more of the systems described herein with respect to FIGS. 1A-1C) may perform one or more of the steps shown as part of technical diagram 400. For example, a system (e.g., the system 130 described herein with respect to FIG. 1A-1C) may perform one or more of the steps shown as part of technical diagram 400.

For example, and as shown in technical diagram 400, when a primary site 410 is performing correctly, then the primary site may be connected to a source database 411 via an imitation artifact 414, a source file 412 via an imitation artifact 415, a target file 413 via an imitation artifact 416, whereby as the primary site is performing, the imitation artifact(s) may act as an interface between the primary site and each of the database, source site (e.g., source file 412), and target site (e.g., target file 413) to carry out the tasks of the batch process. Additionally, and as each of the tasks are completed by the primary site 410, the record counter may be updated (e.g., the N Records collected and or sent from or to each database 411, source file 412, and/or target file 413).

Additionally, as the primary site 410 is operating correctly, the backup site 420 may use the imitation artifact as a sink or black hole for the tasks and/or operations and their associated data as they are completed in the primary site. Thus, and in this manner, an "X" marking may be shown between the database 411 and the imitation artifact 414, the source file 412 and the imitation artifact 415, and the target file 413 and the imitation artifact 416. Further, and as shown in backup site 420 may not write anything to its record as none of the functions or operations have yet been performed by the backup site.

In some embodiments, the imitation artifact 414 may connect to the database 411, in the backup site 420, using the smart query and response time to calculate the record counter and derive the current cursor position, all while acting as a sink for the database 411. Further, and in some embodiments, the imitation artifact 415 may connect to the source file 412 to check file accessibility and use the response time to calculate the record counter and derive the cursor position while acting as a sink for the source file 412. Additionally, and in some embodiments, the imitation artifact 416 of the backup site may connect to the target file 413 and check file accessibility and use the response time to calculate the number of records written to the target file to determine/validate the current cursor position, while acting as a sink for the target file 413.

In some embodiments, and upon identifying that the primary site 410 has been interrupted in its functionality, the system may switch to the backup site, which is already connected by imitation artifacts to the database 411, the source file 412, and the target file 413 via the imitation artifacts 414, 415, and 416, which may be switched to act as the interface between the backup site 420 and each of these database and files to continue with the tasks and operations to complete the batch process. Further, and in order to prevent any redundant processing by the backup site, the backup site 420 may use the imitation artifacts as a sink or black hole based on the current cursor position and record counter, which is in real time or near real time updated as the process ran on the primary site.

Thus, and in some embodiments, the imitation artifacts shown and described herein may comprise one imitation artifact shared between the primary and backup site, multiple imitation artifacts shared between the primary and backup site, and/or the like. However, and based on the current functioning of each primary site and backup site, the functionality and operations of the imitation artifact(s) may change dynamically and automatically to handle the current tasks of the batch process.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for auto-establishing data transfers between data centers for batch processing, the system comprising:
   a memory device with computer-readable program code stored thereon;
   at least one processing device operatively coupled to the at least one memory device and the at least one communication device, wherein executing the computer-readable code is configured to cause the at least one processing device to:
   identify at least one process associated with a primary site;
   determine a backup site associated with the primary site;
   apply the at least one process to the backup site, wherein the application of the at least one process to the backup site is in real time or near real time to the identification of the at least one process associated with the primary site;
   generate, by an imitation artifact component, a record counter of the process as the process runs in the primary site, wherein the record counter comprises a cursor position indicating a current operation of the process; and
   mimic, using the imitation artifact component and based on the record counter, the process in the backup site as the process runs in the primary site.

2. The system of claim 1, wherein executing the computer-readable code is further configured to cause the at least one processing device to:
   identify an interruption to the primary site, wherein the interruption occurs during the process running on the primary site;
   connect, in response to the interruption to the primary site, the imitation artifact component to a target site based on a smart query, wherein the smart query validates the cursor position of the record counter;
   run, in the backup site and in response to identifying the interruption to the primary site, the process from the validated cursor position of the process, wherein the backup site comprises a sink that drops a portion of the process completed in the target site that precedes the cursor position; and
   connect the backup site to the target site for a portion of the process at the start of the cursor position.

3. The system of claim 1, wherein the cursor position is based on a process time comprising a time since a start of processing running in the primary site.

4. The system of claim 3, wherein the cursor position is based on a response time of a read operation and a write operation of the process running on the primary site, and wherein the response time is determined based on a volume of output dataset and a central processing unit (CPU) utilization of the primary site.

5. The system of claim 1, wherein the primary site comprises a primary data center.

6. The system of claim 1, wherein the backup site comprises a backup data center.

7. The system of claim 1, wherein the imitation artifact component comprises an interface between the process and a target site or a source site.

8. The system of claim 1, wherein the imitation artifact component is housed on the backup site and wherein the imitation artifact component operates as a sink until an instance where the process in the primary site is interrupted.

9. The system of claim 1, wherein the current operation comprises at least one of a read operation or a write operation.

10. The system of claim 9, wherein the read operation or the write operation is based on the read operation at a target site or the write operation at the target site for the at least one process.

11. The system of claim 1, wherein the backup site comprises a plurality of backup sites.

12. A computer program product for auto-establishing data transfers between data centers for batch processing, the computer program product comprising a non-transitory computer-readable medium comprising code causing an apparatus to:

identify at least one process associated with a primary site;

determine a backup site associated with the primary site;

apply the at least one process to the backup site, wherein the application of the at least one process to the backup site is in real time or near real time to the identification of the at least one process associated with the primary site;

generate, by an imitation artifact component, a record counter of the process as the process runs in the primary site, wherein the record counter comprises a cursor position indicating a current operation for the process; and mimic, using the imitation artifact component and based on the record counter, the process in the backup site as the process runs in the primary site.

13. The computer program product of claim 12, the computer program product further comprising non-transitory computer-readable medium comprising code causing an apparatus to:

identify an interruption to the primary site, wherein the interruption occurs during the process running on the primary site;

connect, in response to the interruption to the primary site, the imitation artifact component to a target site based on a smart query, wherein the smart query validates the cursor position of the record counter;

run, in the backup site, the process from the validated cursor position of the process, wherein the backup site comprises a sink that drops a portion of the process completed in the target site that precedes the cursor position; and connect the backup site to the target site for a portion of the process at the start of the cursor position.

14. The computer program product of claim 12, wherein the cursor position is based on a process time comprising a time since a start of processing running in the primary site.

15. The computer program product of claim 12, wherein the cursor position is based on a response time of a read operation and a write operation of the process running on the primary site, and wherein the response time is determined based on a volume of output dataset and a central processing unit (CPU) utilization of the primary site.

16. A computer implemented method for auto-establishing data transfers between data centers for batch processing, the computer implemented method comprising:

identifying at least one process associated with a primary site;

determining a backup site associated with the primary site;

applying the at least one process to the backup site, wherein the application of the at least one process to the backup site is in real time or near real time to the identification of the at least one process associated with the primary site;

generating, by a imitation artifact component, a record counter of the process as the process runs in the primary site, wherein the record counter comprises a cursor position indicating a current operation for the process; and mimicking, using the imitation artifact component and based on the record counter, the process in the backup site as the process runs in the primary site.

17. The computer implemented method of claim 16, further comprising:

identifying an interruption to the primary site, wherein the interruption occurs during the process running on the primary site;

connecting, in response to the interruption to the primary site, the imitation artifact component to a target site based on a smart query, wherein the smart query validates the cursor position of the record counter;

running, in the backup site, the process from the validated cursor position of the process, wherein the backup site comprises a sink that drops a portion of the process completed in the target site that precedes the cursor position; and connecting the backup site to the target site for a portion of the process at the start of the cursor position.

18. The computer implemented method of claim 16, wherein the cursor position is based on a process time comprising a time since a start of processing running in the primary site.

19. The computer implemented method of claim 16, wherein the cursor position is based on a response time of a read operation and a write operation of the process running on the primary site, and wherein the response time is determined based on a volume of output dataset and a central processing unit (CPU) utilization of the primary site.

\* \* \* \* \*